(12) United States Patent
Gansweidt

(10) Patent No.: US 8,297,419 B2
(45) Date of Patent: Oct. 30, 2012

(54) INTERCHANGEABLE ENERGY-ABSORBING UNIT, IN PARTICULAR FOR USE IN COMBINATION WITH A BUFFER

(75) Inventor: Michael Gansweidt, Braunschweig (DE)

(73) Assignee: Voith Patent GmbH, Heidenheim (DE)

( * ) Notice: Subject to any disclaimer, the term of this patent is extended or adjusted under 35 U.S.C. 154(b) by 910 days.

(21) Appl. No.: 12/232,163

(22) Filed: Sep. 11, 2008

(65) Prior Publication Data

US 2009/0065317 A1 Mar. 12, 2009

(30) Foreign Application Priority Data

Sep. 11, 2007 (EP) .................................... 07116137

(51) Int. Cl.
*B61G 11/00* (2006.01)
(52) U.S. Cl. ........................ 188/374; 213/220; 213/221
(58) Field of Classification Search .................. 188/371, 188/374, 377; 105/392.5; 213/220, 221; 213/7–9; 293/133; 296/187.03, 187.09
See application file for complete search history.

(56) References Cited

U.S. PATENT DOCUMENTS

| | | | |
|---|---|---|---|
| 3,428,150 A | | 2/1969 | Muspratt |
| 3,899,047 A | * | 8/1975 | Maeda et al. ................. 188/374 |
| 5,588,511 A | * | 12/1996 | Kallenbach ................... 188/374 |
| 6,393,999 B1 | * | 5/2002 | Schneider ................... 105/392.5 |
| 7,543,537 B2 | * | 6/2009 | Seitzberger et al. ........ 105/392.5 |
| 7,735,427 B2 | * | 6/2010 | Gansweidt ................. 105/392.5 |
| 2007/0040354 A1 | * | 2/2007 | Wacker et al. ................. 280/483 |
| 2007/0175851 A1 | * | 8/2007 | Hogbring ..................... 213/62 R |

FOREIGN PATENT DOCUMENTS

| | | |
|---|---|---|
| DE | 747 330 C | 9/1944 |
| DE | 297 03 351 U1 | 4/1997 |
| EP | 0 826 569 A | 3/1998 |
| EP | 0 926 381 A1 | 6/1999 |
| GB | 1 351 735 A | 5/1974 |
| GB | 1 419 698 A | 1/1976 |
| RU | 2181677 C | 4/2002 |
| RU | 2000122472 | 8/2002 |

OTHER PUBLICATIONS

Machine translation of EP 0 926 381 A1.*

* cited by examiner

*Primary Examiner* — Bradley King
(74) *Attorney, Agent, or Firm* — Jean C. Edwards, Esq.; Edwards Neils PLLC

(57) ABSTRACT

The present invention relates to an energy-absorbing unit, including a UIC buffer or a side buffer, which provides an additional irreversible shock-absorbing stage for e.g., a UIC buffer which can be retroactively installed, an energy-absorbing unit, is proposed which is mountable to the support frame or undercarriage, of e.g., a railborne vehicle as one complete exchangeable unit. The energy-absorbing unit hereto includes a base plate for preferably detachable connecting of the energy-absorbing unit to the support frame or undercarriage of a car body, a connecting plate, to which e.g., the UIC buffer can be connected, and a destructively-configured energy-absorbing element which is braced between the base plate and the connecting plate without play.

8 Claims, 3 Drawing Sheets

INTERCHANGEABLE ENERGY-ABSORBING UNIT, IN PARTICULAR FOR USE IN COMBINATION WITH A BUFFER

CROSS-REFERENCE TO RELATED APPLICATIONS

The present invention claims priority from European Patent Application No. 07 116 137.6, filed Sep. 11, 2007, the contents of which are herein incorporated by reference in their entirety.

BACKGROUND OF THE INVENTION

1. Field of the Invention

The present invention relates to an energy-absorbing unit which is particularly suited for use as an additional irreversible shock-absorbing stage together with a component for transferring force.

2. Description of the Related Art

Printed publication DE 297 03 351 U1 describes an element for absorbing kinetic energy, wherein said element works mechanically according to the plastic deformation principle. Specifically, this prior art proposes an energy-absorbing element including a base plate and a connecting plate, wherein an energy-absorbing element is fixed between these two plates. Said energy-absorbing element is a thick-walled plastic tube which on the one hand exhibits a certain initial elasticity and, on the other, an almost rectangular plastic working stroke. The initial elasticity of the absorption element yields deformation protection upon minor impacts. A plastic deformation of the section occurs after a working stroke beyond the yield strength, in consequence of which the section exhibits a reduced length with a bulged enlarged outer diameter.

The DE 747 330 C printed publication relates to a plunger buffer having an integrated energy-absorbing element. The conventional plunger buffer includes a buffer rod which, aided by a buffer bar and a buffer spring provided within said buffer rod, is affixed to the front end of a railcar body such that the buffer rod is capable of absorbing moderate impacts. After the maximum available damping stroke has been exhausted, the buffer plate strikes against a flange projecting into the front section of a deformation tube.

A buffer/drawgear mechanism including a telescoped arrangement of deformation tubes which plastically deform successively upon the operating load of the buffer/drawgear mechanism being exceeded is known from printed publication U.S. Pat. No. 3,428,150.

A damping element for a vehicle including at least one irreversibly-designed energy-absorbing element in the form of a deformation tube is known from printed publication GB 1 419 698 A.

Printed publication EP 0 826 569 A2 describes an impact protection device for railborne vehicles including a side buffer and an energy-absorbing unit downstream of said side buffer. Specifically, the energy-absorbing unit is in principle designed as a "crash box" detachably affixable at one side to the front end of the railcar body while the side buffer can likewise be detachably affixed to the other side of the crash box. This prior art explicitly teaches using a box-shaped crash box tapering toward the side buffer as the energy-absorbing unit so as to enable the most controlled possible buckling of the energy-absorbing element in the event of a crash.

It is therefore, generally known in the field of rail vehicle technology, to equip for example, the individual car bodies of a multi-member vehicle, with so-called side buffers or International Union of Railways (UIC) buffers when the car bodies are not connected together by a bogie and thus, the distance between the two coupled car bodies can vary during normal vehicle operation. These side buffers thereby serve to absorb and dampen impacts occurring during normal vehicle operation, for example when braking or bringing up to speed.

A telescoped structure is normally utilized for the side buffer which includes a buffer housing, a force-transferring member accommodated therein and a damping element in the form of a spring or an elastomer body. With this type of structure, the buffer housing serves as a longitudinal guide and for the supporting of transverse forces while the damping element accommodated in the buffer housing serves in transferring force in the longitudinal direction.

The overall length as well as the buffer stroke; i.e., the spring travel of the damping element, is standardized for certain vehicle categories by European regulations (e.g., the UIC 526 and 528 leaflets). The buffer stroke for a standardized UIC buffer, for example, is within a range of from 100 to 110 mm. After reaching maximum buffer stroke, the damping characteristic of the side buffer is exhausted, in consequence of which impact forces which exceed the characteristic operating load of the side buffer are routed to the vehicle undercarriage undampened.

While the impact forces which occur during normal operation of the vehicle, for example, between individual car bodies of a multi-member vehicle, are thus, absorbed by the regeneratively-designed damping element integrated in the side buffer, when the operating load of the side buffer is exceeded, however, for instance when the vehicle collides with an obstacle or when the vehicle is abruptly braked, the damping element integrated in the side buffer is usually unable to absorb the total resulting energy. The shock absorbance provided by the side buffer is thus, no longer integrated into the energy-absorbing concept of the vehicle as a whole, such that the resulting impact forces are transmitted directly to the vehicle undercarriage. This subjects same to extreme loads with the potential to damage or even destroy same.

With the goal of preventing such damage, it is conventionally known to design the guiding members of the plunger buffer such that after the maximum buffer stroke has been exhausted; i.e., after the guiding members of the side buffer (buffer sleeve and buffer rod) strike defined arresters, there is an additional contracting possibility with controlled deformation.

For example, the WO 2005/115818 A1 printed publication describes a plunger buffer in which after the energy absorption provided by the regeneratively-designed damping element has been exhausted, predetermined break joints break away so as to thus increase the contracting length of the buffer. This increased contracting length allows the plastic deformation of the buffer housing upon overload so that this solution enables a destructive conversion of impact energy into the work of deformation and heat. The resulting deformation of the buffer housing which occurs upon overload thus provides an additional protection against impacts to the shock absorbance provided by the side buffer.

Even if this side buffer known in the art can protect the vehicle undercarriage up to a certain degree from damage upon severe collisions, it is thereby not possible to adapt the additional shock absorber to specific applications. To do so would require commensurately designing the force-path characteristic for the deformation of the buffer housing so as to enable a predictable, defined absorption of energy. In particular, the known solution is unsuited for many applications since the maximum energy absorption achievable with the deformation of the buffer housing is often too low.

A further disadvantage can be seen in the fact that after the additional shock absorber has been activated, the entire side buffer needs to be replaced since the shock absorber is integrated in the side buffer and because due to the at least partial deformation of the buffer housing, the side buffer can no longer be used in normal vehicle operation.

SUMMARY OF THE INVENTION

Based on the given problem as set forth, the invention is thus, based on the task of specifying an energy-absorbing unit for a component for transferring forces which arise during normal vehicle operation, in particular a side buffer, in which on the one hand, the impact energy transferred via the side buffer upon an extreme impact can be reliably dissipated and, on the other, the force-path characteristic of the energy-absorbing unit can be adapted to individual applications as exactingly as possible. Additionally, the energy-absorbing unit is to lend itself to subsequent installation into or retrofitting of a conventional side buffer in which no destructive shock absorbance has been provided.

The task on which the invention is based is solved by an energy-absorbing unit which is mountable as a complete exchangeable unit to the support frame or undercarriage of a car body of a multi-member vehicle, in particular a railborne vehicle, wherein the energy-absorbing unit includes a base plate for the preferably detachable connecting of the energy-absorbing unit to a supporting structure, for example, to the support frame or undercarriage of a car body, a connecting plate, to which a component for transferring forces occurring during normal vehicle operation and upon crashes can be connected, and a destructive energy-absorbing element braced without play between the base plate and the connecting plate. The energy-absorbing element is thereby integrated into the energy-absorbing unit such that impact forces can be transmitted in the longitudinal direction of the energy-absorbing unit, and doing so, by the force flow resulting from the transfer of force running at least partly through the energy-absorbing element. The energy-absorbing element itself is designed such that the base plate and the connecting plate remain substantially rigid relative to one another in the longitudinal direction of the energy-absorbing unit up to a definable amount of energy transferred by the force flow through the energy-absorbing element, and that upon the definable amount of energy transferred by the force flow through the energy-absorbing element being exceeded, the base plate and the connecting plate are displaced relative one another in the longitudinal direction of the energy-absorbing unit by the simultaneous plastic deformation of the energy-absorbing element.

The inventive solution thus, relates to an energy-absorbing unit configured as a module; i.e., as one complete exchangeable functional group. It is thus, possible to also retroactively equip e.g., side buffers or other components for transferring force with additional shock absorbance. All that would be needed to do so is to fit the energy-absorbing unit between the side buffer or force-transferring component and the support frame or undercarriage of e.g., the railcar body. When the inventive solution is used in combination with a side buffer, the side buffer thus serves as a regeneratively-designed shock absorber, in which impact forces occurring during normal vehicle operation, for example, between the individual car bodies of a multi-member vehicle, are absorbed or damped. Upon the operating load of the regeneratively-designed damping element integrated in the side buffer being exceeded, however, the energy-absorbing unit downstream the side buffer is activated, whereby the impact energy is converted into the work of deformation and heat by a defined plastic deformation of the destructive energy-absorbing element. Thus, the regeneratively-designed damping element (spring device) of the side buffer as well as the other components of the side buffer can be effectively protected against destruction or damage in the event of a crash. In fact, it is only the energy-absorbing unit which needs to be replaced as a complete module after a crash.

By employing the destructive energy-absorbing element braced without play between the base plate and the connecting plate, which is activated upon a specific (definable) amount of energy, it is possible to exactingly adapt the characteristic of the energy-absorbing element to individual applications. It is thus, in particular, possible to predefine the activation force and the maximum amount of energy absorbable by the energy-absorbing unit and explicitly adapt same to specific applications. Thus, not only the activation force but also the sequence of events to the energy absorption is predefinable.

The expression "substantially rigid" as used in conjunction hereto denotes that in the ideal case, there is no play whatsoever between the base plate and the connecting plate, including prior to the activation of the energy-absorbing element or energy-absorbing mechanism respectively.

It is thus, particularly preferential for essentially the full force flow ensuing upon the transfer of impact forces in the longitudinal direction of the energy-absorbing unit to run through said energy-absorbing unit. What this achieves is that the energy absorption of the energy-absorbing unit, and in particular the characteristic energy absorption activation force, can be precisely predefined by the design to the energy-absorbing element. Of course, however, it is also conceivable for only a portion of the force flow ensuing upon the transfer of impact forces in the longitudinal direction of the energy-absorbing unit to run through the energy-absorbing unit, whereby the remaining portion of the force flow is guided past the energy-absorbing element by means of the appropriate devices such that this portion is transmitted directly from the connecting plate to the base plate.

One preferred realization of the energy-absorbing unit provides for configuring the energy-absorbing element as a deformation tube which plastically deforms upon the exceeding of the definable amount of energy transferred by the force flow through the energy-absorbing element, preferably by cross-sectional expanding, and permits the relative movement of the base plate and the connecting plate to one another. An energy-absorbing unit in which a deformation tube is employed as the energy-absorbing element is characterized by exhibiting a defined activation force with no spikes in the force. By virtue of this characteristic proceeding in substantially rectangular manner, maximum energy absorption is thus, ensured after the energy-absorbing unit has been activated. Particularly preferred is for the deformation tube to plastically deform along with simultaneous cross-sectional expanding upon activation of the energy-absorbing unit. Of course, however, energy absorption along with simultaneous cross-sectional decreasing of the deformation tube is also conceivable. Necessary hereto would be the pressing of the deformation tube through a nozzle opening provided for example, in the base plate of the energy-absorbing unit so that the plastically deformed energy-absorbing element would be expelled from the energy-absorbing unit. A deformation tube which plastically deforms upon activation of the energy-absorbing unit by cross-sectional expanding avoids this type of expelling of the deformed energy-absorbing element. For this reason, the preferred embodiment at the present time is the deformable energy-absorbing element with cross-sectional expansion.

A preferred development of the latter embodiment in which the energy-absorbing element is configured as a deformation tube provides for the deformation tube to be braced between the base plate and the connecting plate by means of at least one tensioning element connecting the base plate with the connecting plate. This ensures a no-play integration of the energy-absorbing element in the energy-absorbing unit, whereby with the appropriate initial load, the response characteristic of the energy-absorbing element can also be influenced, and respectively predefined.

For example, stud bolts can be utilized as such tensioning elements which are on the one hand fixedly connected to the base plate and, on the other, extend through the connecting plate and are locked there in a nut or other similar screw fitting. Such stud bolts, tensioning element respectively, serve not only to brace the deformation tube between the connecting plate and the base plate, but also assume a longitudinal guide function when the deformation tube plastically deforms after the energy-absorbing unit is activated and the connecting plate is moved toward the base plate. Because the tensioning element is also accorded a guiding function, this prevents any wedging or canting of the individual components of the energy-absorbing unit during the process of energy absorption. It is thus, possible to prevent "seizing" or wedging, in particular, upon vertical or oblique load on the deformation tube; i.e., not fully axial, so as to in principle provide reliable functioning of destructive energy absorption.

By correspondingly selecting the wall thickness and the material for the deformation tube, the characteristic amount of energy transferred by the force flow through the energy-absorbing element for the activation of said energy-absorbing element can be preset. This is a further substantial advantage of a deformation tube as employed in the inventive energy-absorbing unit.

One preferred embodiment of the energy-absorbing unit provides for the deformation tube to be in a material fit connection or positively locked by its base plate-side end to the base plate, while a section of expanded cross-section compared to a section situated closer to the base plate is provided at its connecting plate-side end. With this preferred embodiment, the energy-absorbing unit further exhibits a conical ring configured integrally with a guide element, its connecting plate-side end section connected to the connecting plate and its base plate-side end section extending at least partly into the widened section of the deformation tube and resting against the inner surface of said deformation tube section.

The advantages obtainable with this embodiment are obvious. On the one hand, providing a deformation tube which is braced between the base plate and the connecting plate of the energy-absorbing unit yields an energy-absorbing device which enables maximum energy absorption at the lowest possible space requirements. By utilizing a deformation tube which plastically deforms by cross-sectional expanding, it is in particular not necessary to provide an additional space for expelling the plastically deformed deformation tube. On the other hand, by providing the guide element, the preferred embodiment also allows a very exact predefining of the sequence of events ensuing in energy absorption, for example in the event of a crash.

Said guide element, configured integrally with the conical ring and connected by its connecting plate-side end with the connecting plate of the energy-absorbing unit, extends by its base plate-side end section at least partly into the deformation tube section already exhibiting an expanded cross-section prior to activation of the energy-absorbing unit compared to a section of the deformation tube situated closer to the base plate. Since, on the one hand, the guide element extends at least partly into the expanded section of the deformation tube and rests against the inner surface of said tube section, when the energy-absorbing unit is activated, meaning when the connecting plate with the conical ring and the guide element moves relative the base plate and the deformation tube positively locked or in a material fit connection with the base plate toward said base plate, the base plate-side end section of the guide element runs along the inner surface of the (as of yet) non-expanded deformation tube section and thus, effects an axial guidance for the energy absorption. This axial guidance prevents a canting of the connecting plate, conical ring respectively, in the deformation tube upon the activating of the energy-absorbing unit so that the plastic deformation of the deformation tube (i.e., the plastic cross-sectional expanding of the deformation tube) ensues in a precisely predictable manner and the sequence of events to the energy absorption during a crash as a whole is precisely predictable.

In the latter preferred embodiment, it is of advantage in terms of the manufacture of an energy-absorbing unit for the conical ring and the guide element to be configured integrally with the connecting plate. Of course, however, it is also conceivable for the conical ring with the guide element to be correspondingly coupled to the connecting plate by means of positive-fit engagement or a non-positive connection.

Lastly to be cited as a further advantage of the latter embodiment is that the activation force characteristic for the activation of the deformation tube can be precisely predefined by means of the wall thickness to the deformation tube, the material of the deformation tube as well as the degree of expansion of the connecting plate-side section of the deformation tube.

To summarize briefly, it is to be noted that the inventive energy-absorbing unit according to the invention provides a shock absorber with which both the response characteristic as well as the sequence of events during energy absorption can be predefined. By making the appropriate selection respective the energy-absorbing element, maximum energy absorption is also possible at a smaller overall size. The energy-absorbing unit is in particularly suited for retrofitting a side buffer or UIC buffer as an additional irreversible shock-absorbing stage, wherein said side buffer or UIC buffer is preferably detachably bolted to the connecting plate of said energy-absorbing unit.

BRIEF DESCRIPTION OF THE DRAWINGS

The following will make reference to the accompanying drawings in describing a preferred embodiment of the inventive energy-absorbing unit in greater detail.

DESCRIPTION OF THE INVENTION

Figure 1:
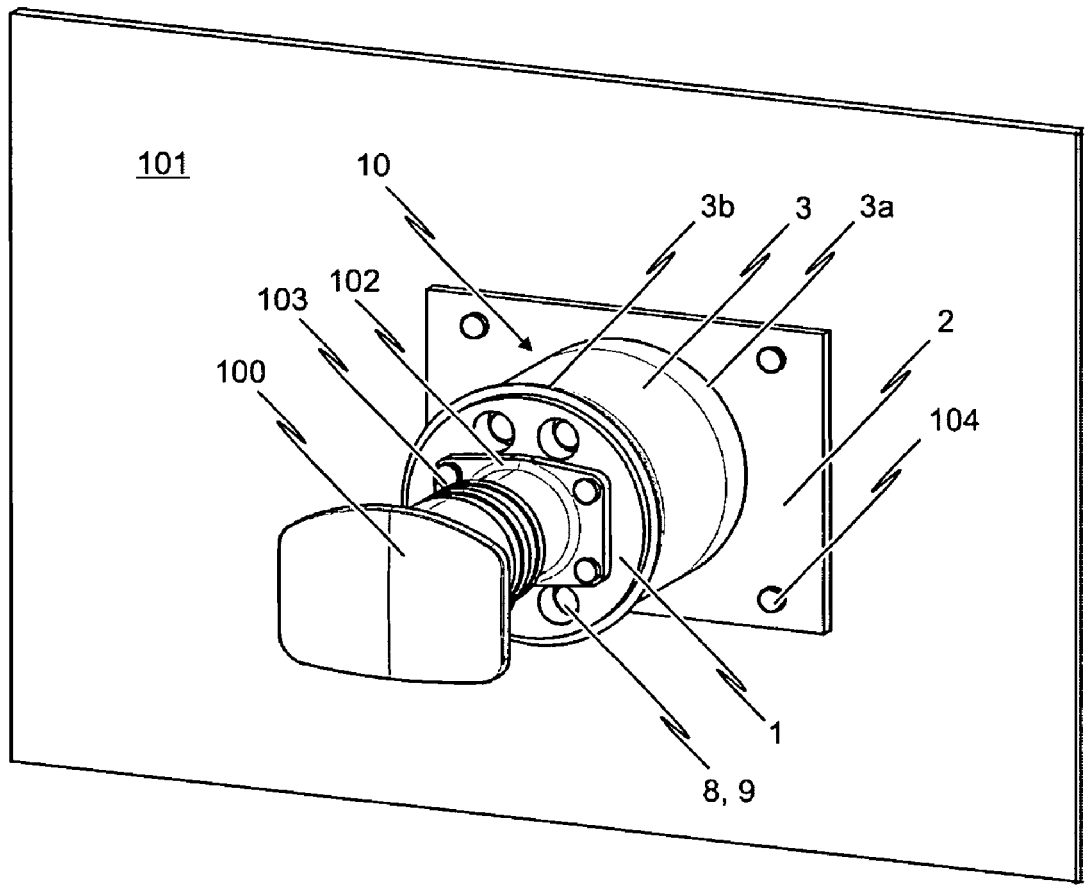
FIG. 1 shows one preferred embodiment of the energy-absorbing unit according to the invention as an additional shock-absorbing stage for an UIC buffer.
Figure 2:
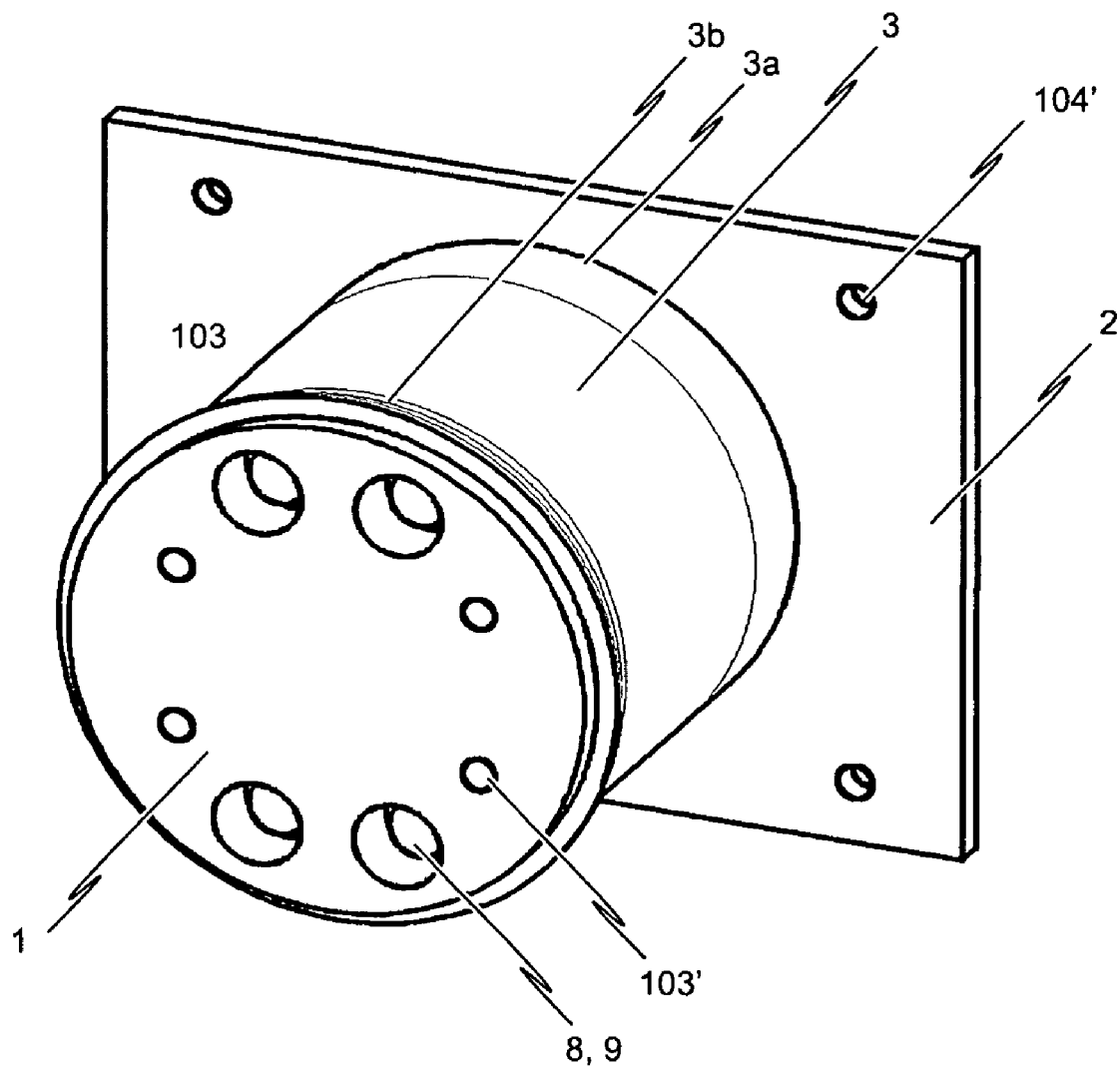
FIG. 2 shows a detail drawing of the energy-absorbing unit according to FIG. 1.

The energy-absorbing unit 10 depicted in FIG. 1 is employed in conjunction with a conventional side buffer or UIC buffer 100, wherein said buffer has, for example, not been equipped with an additional shock absorber. The UIC buffer 100 is hereto affixed by its connecting flange 102 to the connecting plate 1 of energy-absorbing unit 10. Lending itself well hereto are the fixing means 103 already provided for the connecting flange 102 of buffer 100 which, in the embodiment as depicted, consists of a total of four bolts, which can be screwed into the corresponding threaded bores 103' provided in connecting plate 1.

The energy-absorbing unit 10 further includes a base plate 2, with which the energy-absorbing unit 10 can be connected for example to a support frame or undercarriage of a railcar body 101 or however, also another fixed or flexible supporting structure. Employed for this purpose in the embodiment as depicted are a total of four fixing bolts 104 which extend through the throughholes 104' correspondingly provided in base plate 2 and are received in the appropriate threaded bores (not explicitly shown in the Figures).

Because the energy-absorbing unit 10 can be detachably fixed to the supporting structure 101 via the base plate on the one hand and, on the other, a further additional component 100, such as for example a side buffer or a UIC buffer, can likewise be detachably mounted to the connecting plate 1 of energy-absorbing unit 10, the energy-absorbing unit includes a single functional group exchangeable as a whole, which is particularly applicable for subsequent installation or exchange without needing to make modifications to the supporting structure 101 or to the component 100.

The energy-absorbing unit 10 of the preferred embodiment depicted in the drawings further includes in addition to the base plate 2 and the connecting plate 1 described above, a deformation tube as a destructive energy-absorbing element 3 which is braced without play between the base plate 2 and the connecting plate 1. As can be seen in particular from FIG. 3, tensioning elements 4 in the form of stud bolts are utilized hereto. The tensioning elements are connected in a positive-fit, non-positive-fit or material-fit connection to the base plate 2 by their base plate-side ends, extend through almost the entire length of the deformation tube 3, and run through the throughholes correspondingly situated in connecting plate 1. The front side end of the tensioning element 4 is secured to connecting plate 1 by nut 9. In order to ensure an even or flat front end to connecting plate 1, recesses 8 are positioned in the connecting plate to receive the respective nuts 9.

As related above, the tensioning elements 4 serve to brace the deformation tube 3 between the base plate 2 and the connecting plate 1. The tensioning elements 4 are additionally accorded a further guiding function since, due to their construction, they correspondingly guide the connecting plate 1 when the connecting plate 1 moves relative to the deformation tube 3 and the base plate 2 toward said base plate 2 subsequent activation of the energy-absorbing unit 10.

A further axial guidance is provided with the conical ring 7 configured with guide element 6. In the embodiment as depicted, the guide element 6, the conical ring 7 and the connecting plate 1 are of integral configuration; although this is not mandatory.

Figure 3:
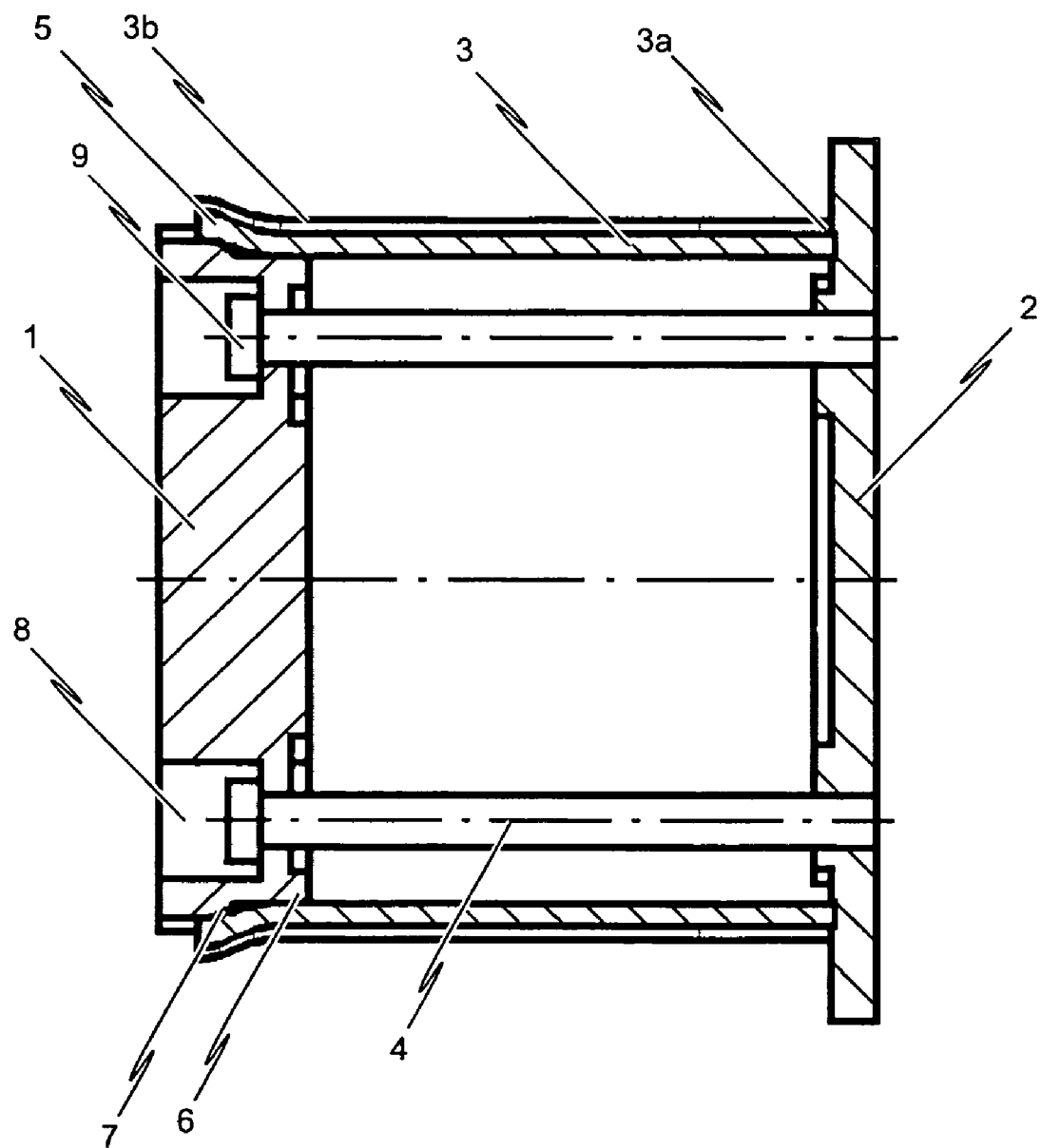
FIG. 3 shows a cross-sectional view through the energy-absorbing unit according to FIG. 2.

Specifically, and as can be particularly noted from FIG. 3, the deformation tube 3 is connected in a positive-fit, non-positive-fit or material-fit connection to the base plate 2 at its base plate-side end 3a. On the other side, the deformation tube 3 has a section 5 on its connecting plate-side end 3b which is of expanded cross-section in comparison to a section situated closer to the base plate 2. This expanded deformation tube section 5 interacts with the guide element 6 and the conical ring 7. The base plate-side end section of the guide element 6 thereby extends at least partly into the expanded deformation tube section 5 and rests against the inner surface of said deformation tube section 5. Upon activation of the energy-absorbing unit 10, meaning when the connecting plate 1 then moves relative to the base plate 2 and the deformation tube 3 fixedly attached to said base plate 2 toward said base plate 2, the base plate-side end section of guide element 6 runs along the inner surface of the (as of yet) non-expanded deformation tube section and thus effects—together with the tensioning elements 4—an axial guiding of base plate 2. This axial guiding of base plate 2 prevents a canting of said base plate 2, the conical ring 7 and the guide element 6 respectively, in the deformation tube 5 when the energy-absorbing unit 10 is activated, whereby this also holds true when not only purely axial forces are being transferred. All told, the plastic deformation of the deformation tube; i.e., the plastic cross-sectional expanding of deformation tube 5, thus, progresses in a predictable manner, and the sequence of events to the energy absorption in a crash situation is altogether predictable as a whole.

The implementation of the invention is not limited to the embodiment described with reference to the figures. In particular, it is also conceivable for the energy-absorbing unit not to be used together with a side buffer, but instead with a bumper bar mount or other such similar impact force-transferring component.

The invention claimed is:

1. A side buffer in combination with an energy-absorbing unit as an additional irreversible shock-absorbing stage, wherein the side buffer is detachably mounted to a connecting plate of the energy-absorbing unit, and wherein the energy-absorbing unit is mountable to a supporting structure as one complete exchangeable module, and wherein the energy-absorbing unit comprises:

a base plate, operative to detachably connect the energy-absorbing unit to the supporting structure, including a support frame or undercarriage of a car body of a multi-member vehicle, including a railborne vehicle;

the connecting plate to which the side buffer is mounted; and a destructively-configured energy-absorbing element in a form of a deformation tube which is integrated into said energy-absorbing unit such that impact forces can be transmitted in the longitudinal direction of said energy-absorbing unit by a force flow resulting from a transfer of force running at least partly through the energy-absorbing element and which is designed such that the base plate and the connecting plate are substantially rigid relative one another in a longitudinal direction of the energy-absorbing unit up to a definable amount of energy transferred by the force flow through the energy-absorbing element, and that upon the definable amount of energy transferred by the force flow through the energy-absorbing element being exceeded, the base plate and the connecting plate are displaced relative one another in the longitudinal direction of the energy-absorbing unit by a simultaneous plastic deformation of the energy-absorbing element, wherein the deformation tube is braced between the base plate and the connecting plate by a plurality of tensioning elements connecting the base plate with the connecting plate, wherein the deformation tube is in a material fit connection with or positively locked to the base plate at a base plate-side, and exhibits a section on the connecting plate-side end which is of expanded cross-section compared to a section situated closer to the base plate, wherein the energy-absorbing unit further comprises a conical ring configured integrally with a guide element, the guide element having a connecting plate-side end section connected to the connecting plate and a base plate-side end section extending at least partly into the widened section of the deformation tube and resting against an inner surface of said deformation tube section, and wherein the plurality of tensioning elements serve to guide the connecting plate when the connecting plate moves relative to the deformation tube and the base plate toward the base plate upon activation of the energy absorbing unit after an impact.

2. The side buffer according to claim 1, wherein substantially the full force flow ensuing upon the transfer of impact and tractive forces in the longitudinal direction of the energy-absorbing unit run through the energy-absorbing element.

3. The side buffer according to claim 1, wherein the deformation tube plastically deforms upon exceeding of the definable amount of energy transferred by the force flow through the energy-absorbing element by one of cross-sectional expanding or cross-sectional decreasing, and permits the relative movement of the base plate and the connecting plate to one another.

4. The side buffer according to claim 3, wherein the deformation tube is braced between the base plate and the connecting plate by the plurality of tensioning elements so as to exert an appropriate initial load by which a response characteristic of the energy-absorbing element can be predefined.

5. The side buffer according to claim 4, wherein a characteristic amount of energy transferred by the force flow through the energy-absorbing element for activation of said energy-absorbing element is preset as a function of a wall thickness and a material of the deformation tube.

6. The side buffer according to claim 1, wherein the conical ring with the guide element is configured integrally with the connecting plate.

7. The side buffer according to claim 1, wherein the activation force characteristic for activation of the deformation tube is predefined as a function of a wall thickness to the deformation tube, a material of the deformation tube as well as a degree of expansion to the connecting plate-side section of the deformation tube.

8. The side buffer according to claim 1, wherein the side buffer comprises at one end thereof a connecting flange which is detachably mounted to the connecting plate by a plurality of bolts which are screwed into corresponding threaded bores provided in the connecting plate.

* * * * *